(12) United States Patent
Nonoyama

(10) Patent No.: US 11,437,632 B2
(45) Date of Patent: Sep. 6, 2022

(54) FUEL-CELL UNIT CELL

(71) Applicant: TOYOTA JIDOSHA KABUSHIKI KAISHA, Toyota (JP)

(72) Inventor: Nobuaki Nonoyama, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 195 days.

(21) Appl. No.: 17/012,302

(22) Filed: Sep. 4, 2020

(65) Prior Publication Data

US 2021/0098799 A1    Apr. 1, 2021

(30) Foreign Application Priority Data

Sep. 30, 2019    (JP) .............................. JP2019-179653

(51) Int. Cl.
| | | |
|---|---|---|
| *H01M 8/0273* | (2016.01) | |
| *H01M 4/88* | (2006.01) | |
| *H01M 8/0258* | (2016.01) | |
| *H01M 8/1004* | (2016.01) | |

(52) U.S. Cl.
CPC ....... *H01M 8/0273* (2013.01); *H01M 4/8807* (2013.01); *H01M 8/0258* (2013.01); *H01M 8/1004* (2013.01)

(58) Field of Classification Search
None
See application file for complete search history.

(56) References Cited

U.S. PATENT DOCUMENTS

| | | |
|---|---|---|
| 5,155,570 A | 10/1992 | Tomizuka et al. |
| 2014/0017590 A1 | 1/2014 | Sugishita et al. |
| 2016/0260989 A1 | 9/2016 | Ikeda et al. |
| 2017/0162882 A1 | 6/2017 | Kawasumi |

FOREIGN PATENT DOCUMENTS

| | | |
|---|---|---|
| JP | 02-051253 A | 2/1990 |
| JP | 2013-251253 A | 12/2013 |
| JP | 5681792 B2 | 1/2015 |
| JP | 2016-081690 A | 5/2016 |
| JP | 2016-162649 A | 9/2016 |
| JP | 2017-168370 A | 9/2017 |
| JP | 2017-182894 A | 10/2017 |

OTHER PUBLICATIONS

U.S. Appl. No. 16/920,896, filed Jul. 6, 2020.

*Primary Examiner* — Haroon S. Sheikh
(74) *Attorney, Agent, or Firm* — Finnegan, Henderson, Farabow, Garrett & Dunner, LLP

(57) ABSTRACT

Disclosed herein is a fuel-cell unit cell, at a first part of which: the fuel-cell unit cell has a bonding layer; between a first separator and an outer peripheral edge portion of a first gas diffusion layer, the bonding layer bonds the first separator and the outer peripheral edge portion together; between the first separator and an outer peripheral edge portion of a membrane-electrode assembly, the bonding layer is bonded to the outer peripheral edge portion of the membrane-electrode assembly; and between the first separator and a support frame and/or between a second separator and the support frame, the bonding layer bonds the support frame and the separator together.

12 Claims, 11 Drawing Sheets

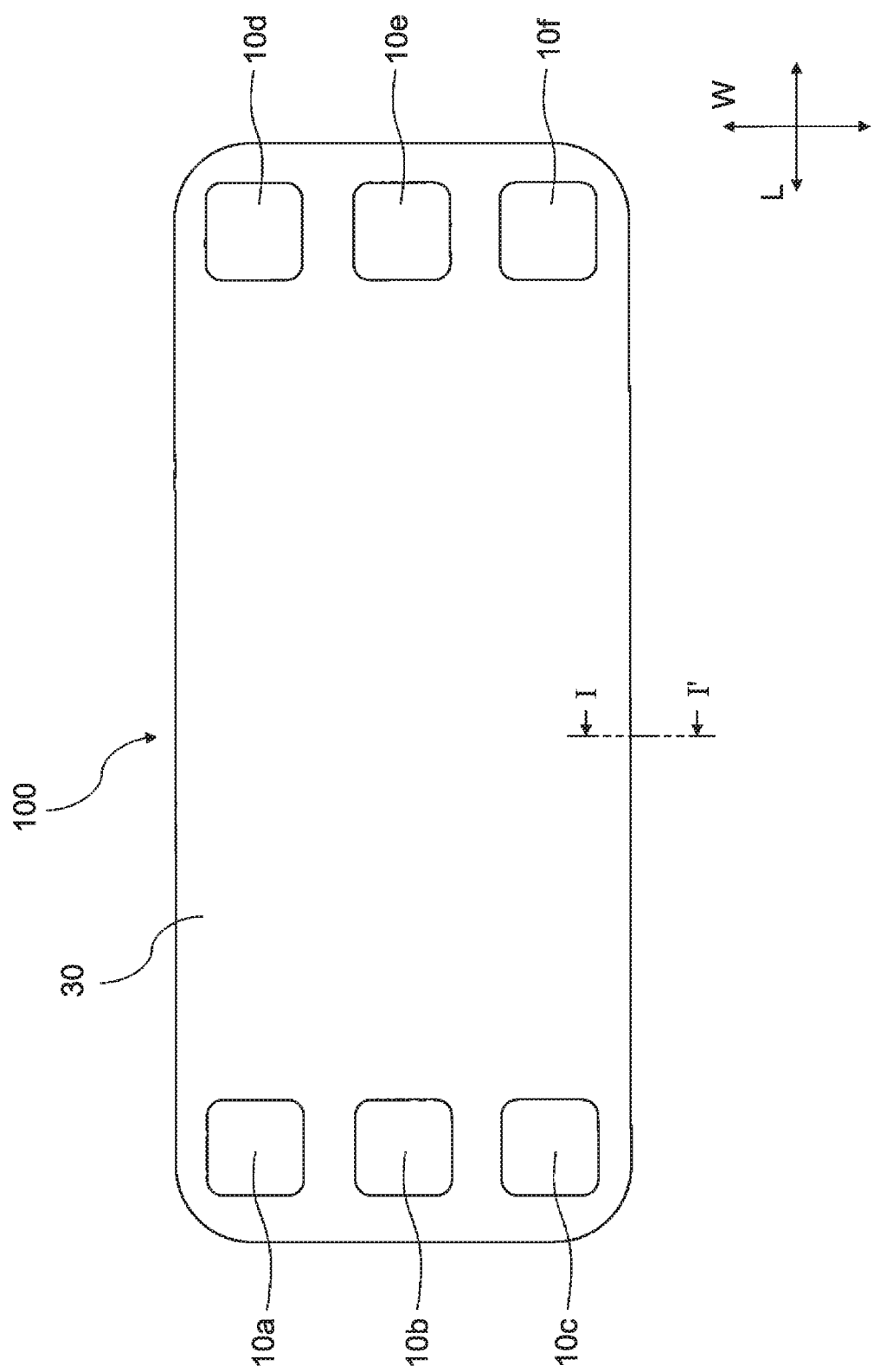

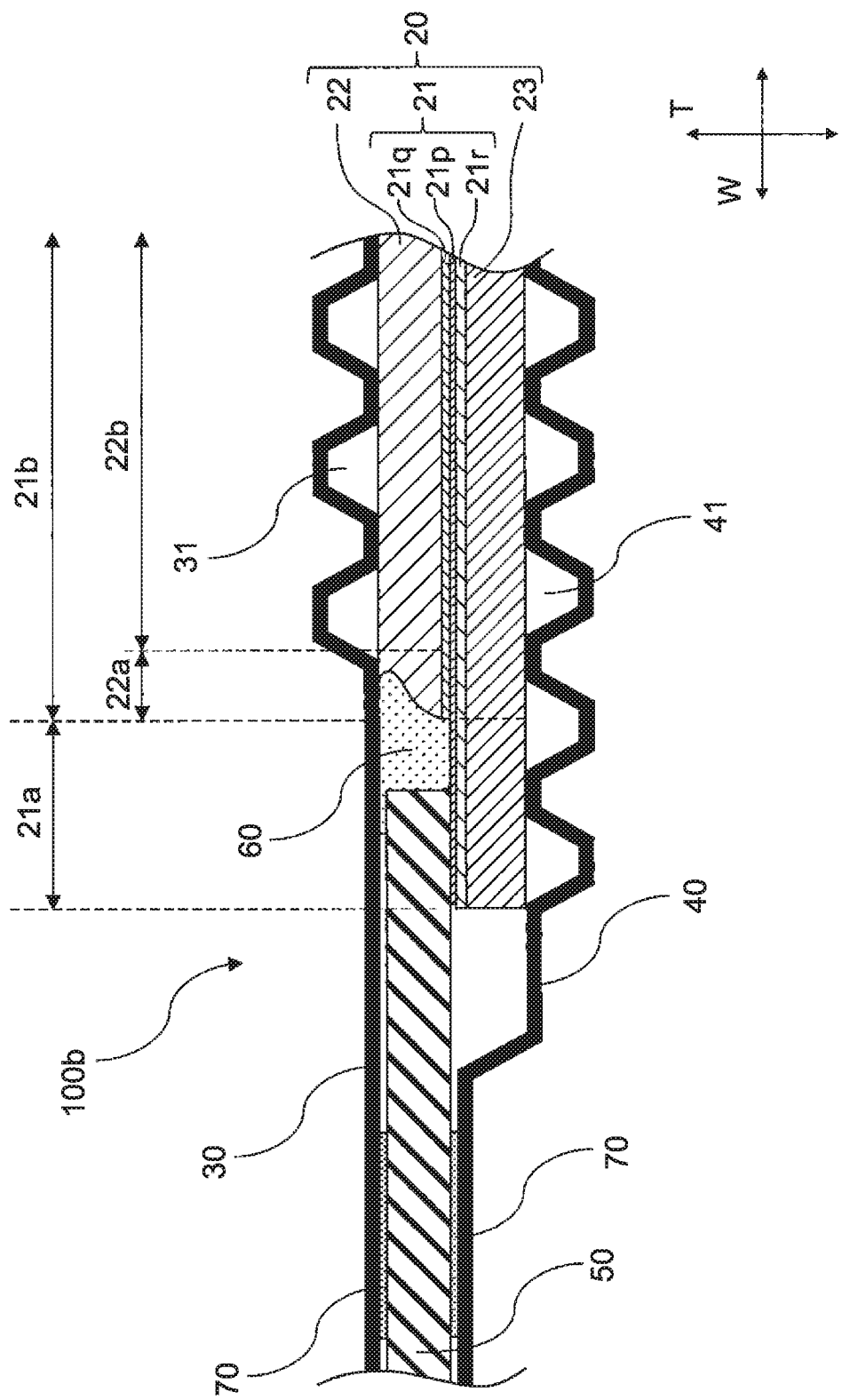

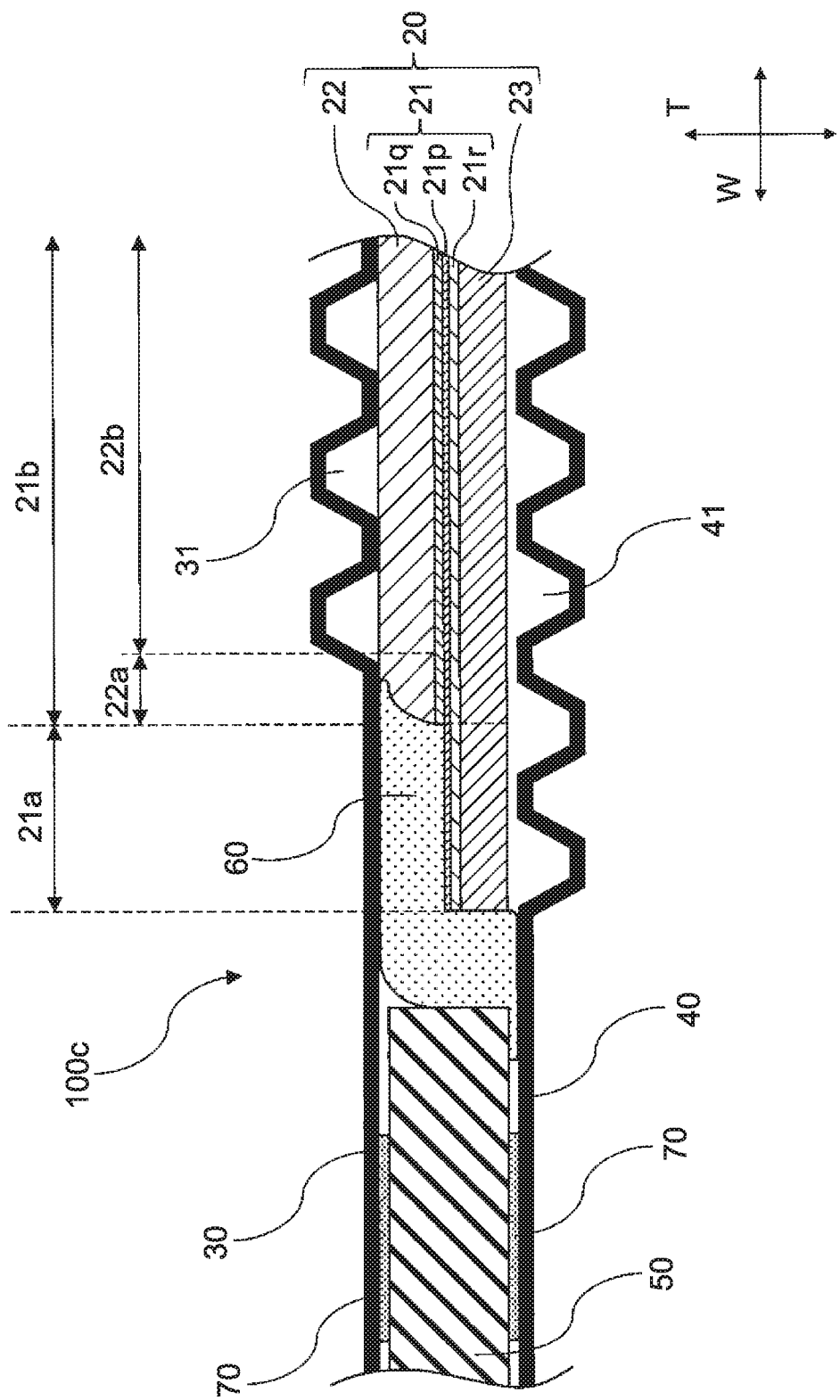

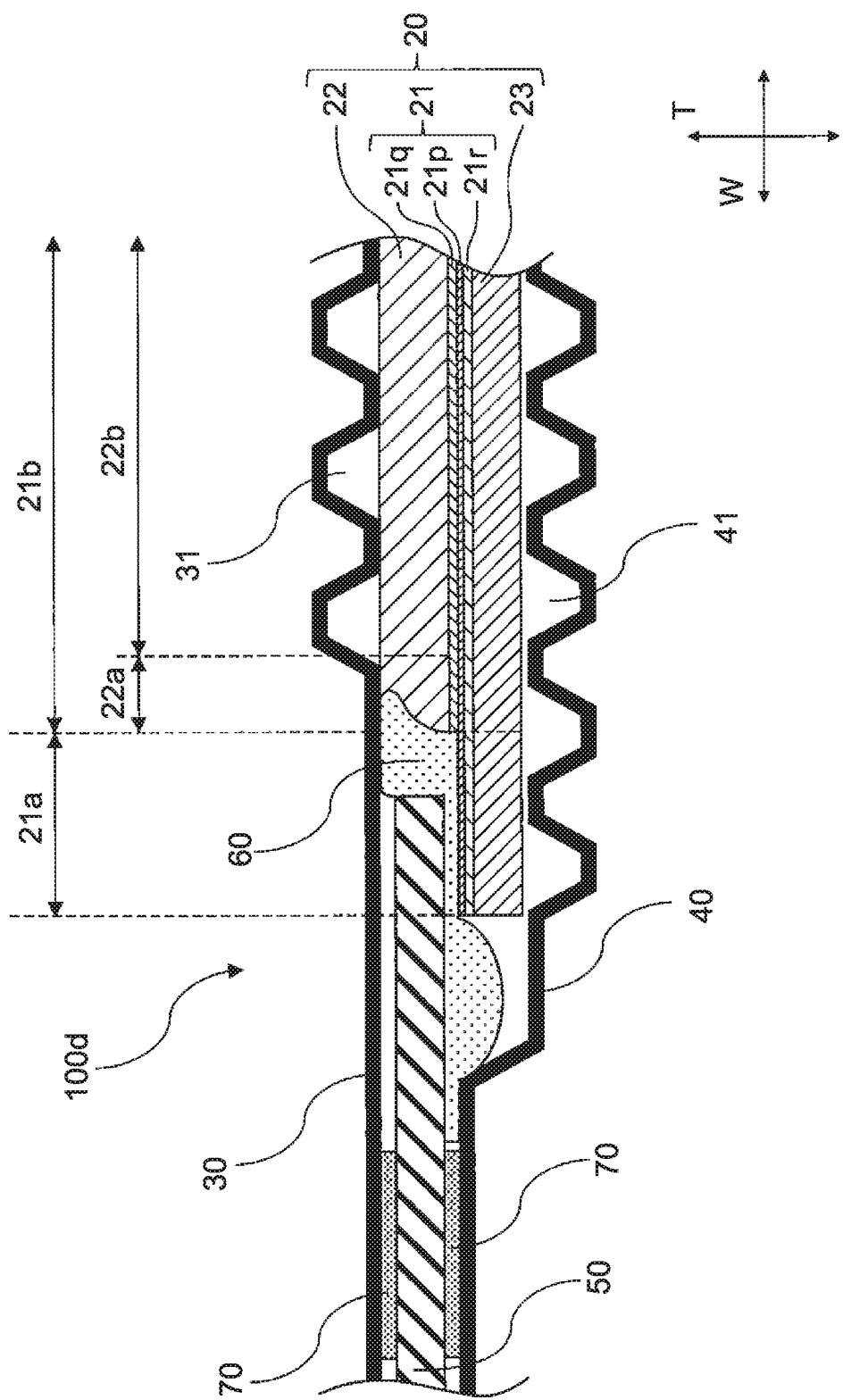

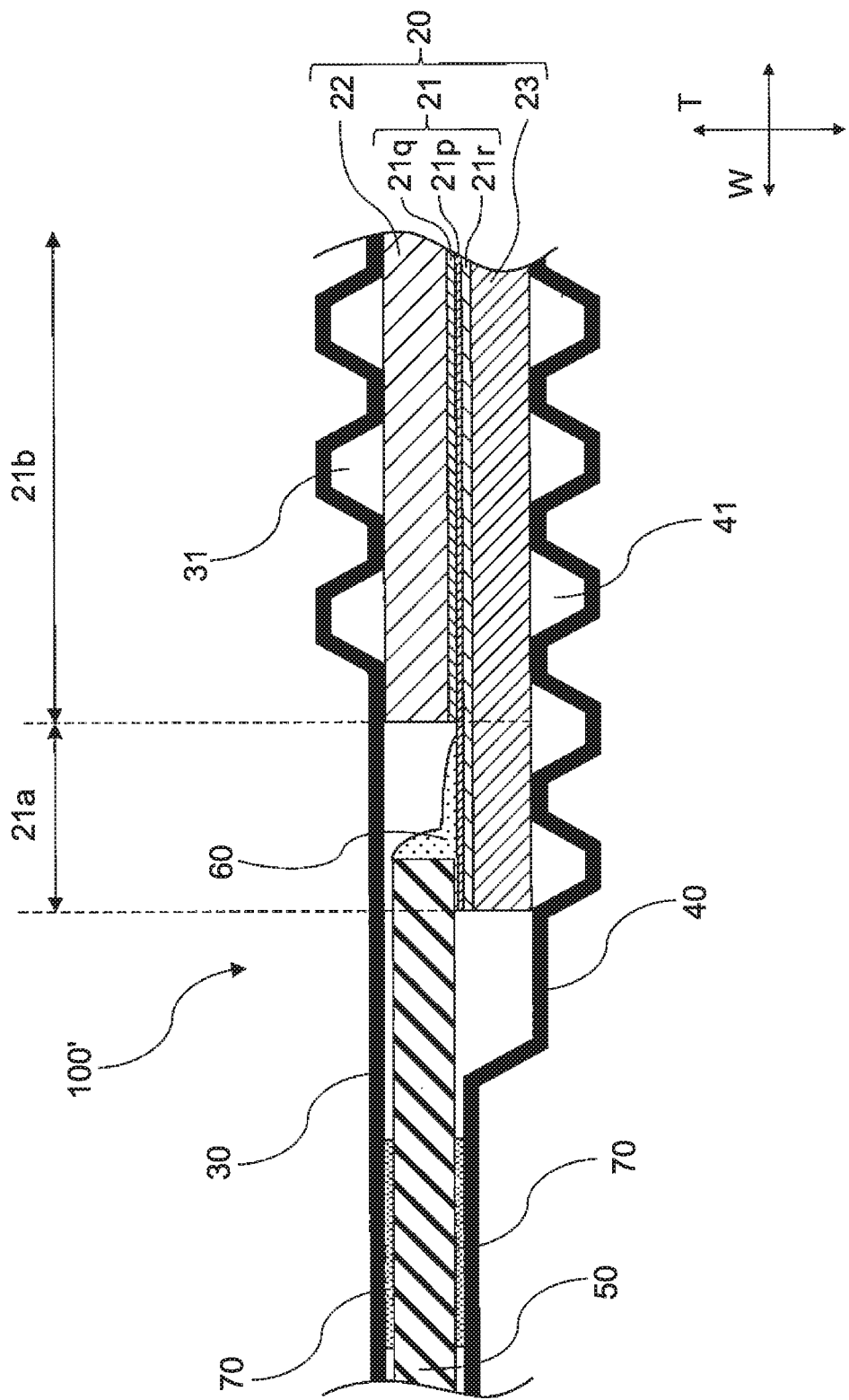

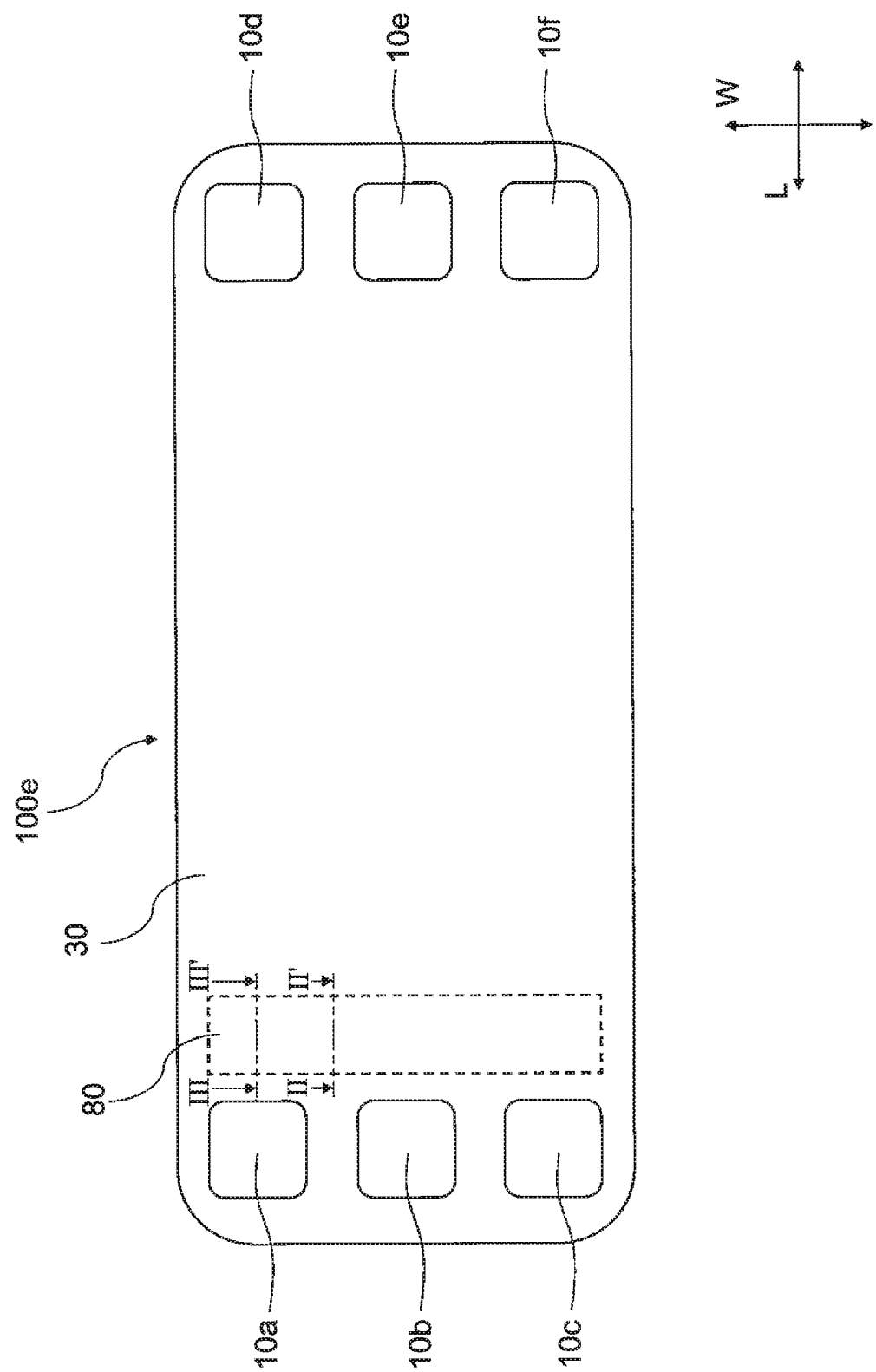

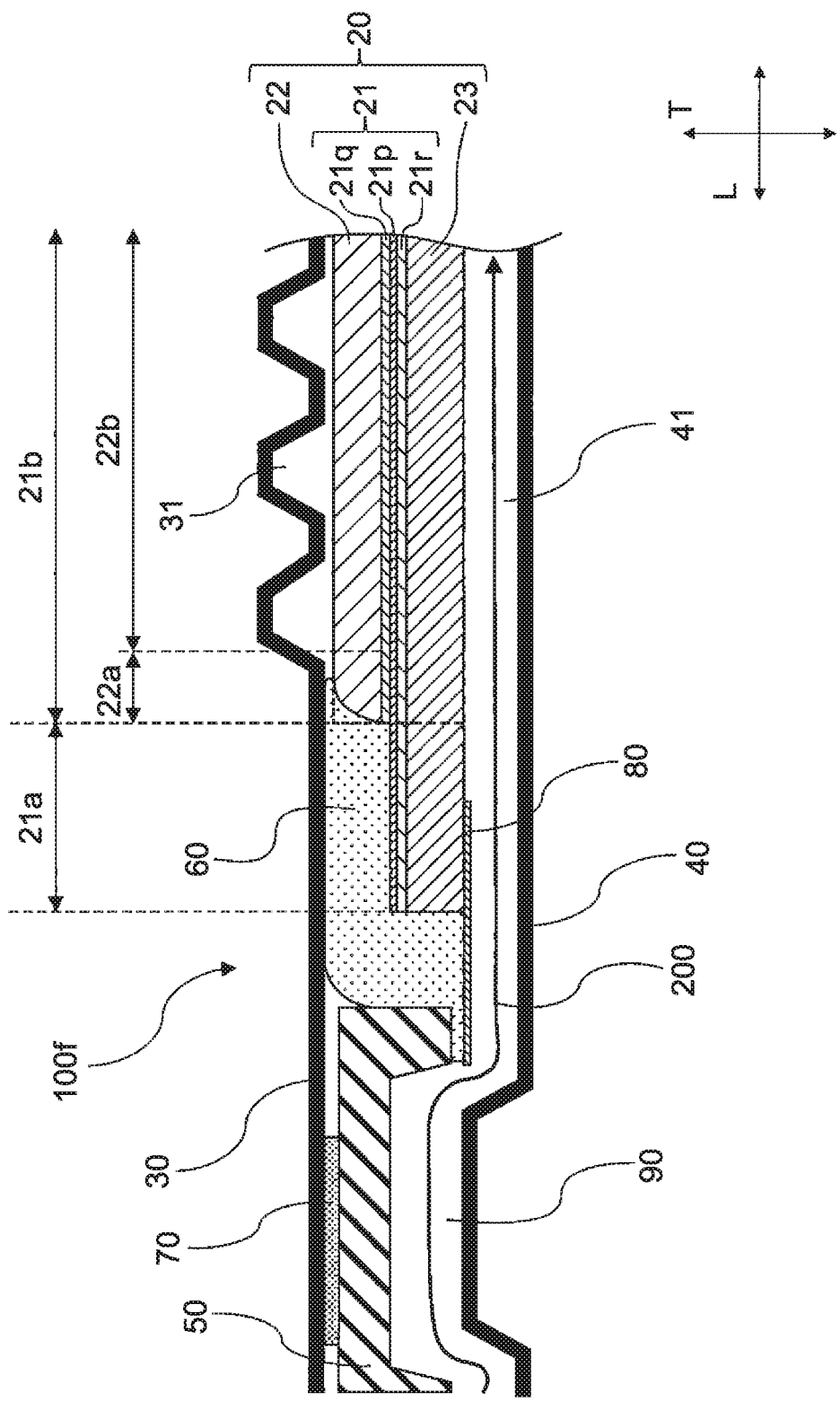

FUEL-CELL UNIT CELL

INCORPORATION BY REFERENCE

The disclosure of Japanese Patent Application No. 2019-179653 filed on Sep. 30, 2019 including the specification, drawings and abstract is incorporated herein by reference in its entirety.

BACKGROUND

1. Technical Field

This disclosure relates to a fuel-cell unit cell.

2. Description of Related Art

In recent years, fuel cells that generate electricity by causing a chemical reaction between an anode gas, such as hydrogen, and a cathode gas, such as oxygen, have become known.

Among known fuel-cell unit cells that are constituent elements of such fuel cells, there are ones that have a configuration in which a gas diffusion layer and a separator are disposed on each surface of a membrane-electrode assembly having an electrolyte membrane and electrode catalyst layers respectively disposed on both surfaces of the electrolyte membrane.

Japanese Patent No. 5681792 discloses a structure of a fuel-cell unit cell in which a resin frame member is provided so as to surround a membrane-electrode assembly, and this resin frame member is partially fused to a gas diffusion layer to fix the membrane-electrode assembly and the resin frame member to each other.

Japanese Patent Application Publication No. 2016-162649 (JP 2016-162649 A) discloses a structure of a fuel-cell unit cell in which a membrane-electrode assembly and a support frame are fixed to each other by a bonding layer.

SUMMARY

The authors of this disclosure have found that the fuel-cell unit cells disclosed in Japanese Patent No. 5681792 and JP 2016-162649 A may deteriorate as an internal structure of the fuel-cell unit cells, for example, the membrane-electrode assembly or the gas diffusion layer tears and/or breaks during manufacturing of the fuel-cell unit cells, manufacturing of a fuel cell stack by stacking multiple fuel-cell unit cells, or usage of the fuel cell stack, i.e., generation of electricity.

This problem is more specifically described as follows.

The fuel-cell unit cells disclosed in Japanese Patent No. 5681792 and JP 2016-162649 A have a structure in which a support frame and a membrane-electrode assembly are bonded together by a bonding layer.

When a fuel-cell unit cell has this structure, stress may be applied to the support frame and the membrane-electrode assembly in an in-plane direction of the fuel-cell unit cell such that the two move away from or toward each other, during manufacturing of the fuel-cell unit cell or during manufacturing of a fuel cell stack by stacking multiple fuel-cell unit cells.

When a fuel-cell unit cell is used, the temperatures of members inside the fuel-cell unit cell change due to heat generated. If the support frame and the gas diffusion layer have different coefficients of thermal expansion, for example, if the support frame is formed by a resin sheet and the gas diffusion layer is formed by a non-woven carbon-fiber cloth or the like, the relationship between the relative positions of an end portion of the support frame facing the gas diffusion layer and the membrane-electrode assembly fixed to the gas diffusion layer may change due to heat generated during usage of the fuel-cell unit cell. This change may be accompanied by stress applied to the support frame and the membrane-electrode assembly in an in-plane direction of the fuel-cell unit cell such that the two move away from or toward each other.

A possible consequence is that the membrane-electrode assembly having relatively low strength may fracture by being stretched in an in-plane direction of the fuel-cell unit cell that is a direction toward an end portion of the fuel-cell unit cell, or may become wrinkled by being pressed in an in-plane direction of the fuel-cell unit cell that is a direction toward the center of the fuel-cell unit cell.

When the configuration in which there is a gap between a support frame and a gas diffusion layer as disclosed in JP 2016-162649 A is adopted, the portion of the fuel-cell unit cell where this gap is located, i.e., the portion where the membrane-electrode assembly is exposed may deform in a thickness direction and fracture due to a gas pressure difference between a cathode side and an anode side during usage of the fuel-cell unit cell.

Moreover, since the separator and the gas diffusion layer are not fixed to each other, when, for example, stress is applied to the fuel-cell unit cell from the outside and the fuel-cell unit cell warps in an in-plane direction, misalignment occurs between the separator and the gas diffusion layer such that the gas diffusion layer moves relatively to the separator in an in-plane direction that is a direction toward an end portion or the center of the fuel-cell unit cell, which may result in fracture of the membrane-electrode assembly having relatively low strength.

Thus, there is need for further enhancing the durability of fuel-cell unit cells.

An object of this disclosure is to provide a fuel-cell unit cell having high mechanical durability.

The authors of this disclosure have found out the following solutions that can achieve this object:

First Aspect

A fuel-cell unit cell including:
(I) an electrode stack having
  (a) a membrane-electrode assembly in which electrode catalyst layers are respectively laid on both surfaces of an electrolyte layer,
  (b) a first gas diffusion layer laid on a first surface of the membrane-electrode assembly except for an outer peripheral edge portion of the membrane-electrode assembly, and
  (c) a second gas diffusion layer laid on a second surface of the membrane-electrode assembly;
(II) a support frame disposed so as to surround the first gas diffusion layer;
(III) a first separator that is laid on a side of the electrode stack on which the first gas diffusion layer is located, in contact with the first gas diffusion layer, and that is fixed to the support frame; and
(IV) a second separator that is laid on a side of the electrode stack on which the second gas diffusion layer is located, in contact with the second gas diffusion layer, and that is fixed to the support frame,
  wherein, at a first part of the fuel-cell unit cell:
  the fuel-cell unit cell has a bonding layer;

between the first separator and an outer peripheral edge portion of the first gas diffusion layer, the bonding layer bonds the first separator and the outer peripheral edge portion together;

between the first separator and the outer peripheral edge portion of the membrane-electrode assembly, the bonding layer is bonded to the outer peripheral edge portion of the membrane-electrode assembly; and between the first separator and the support frame and/or between the second separator and the support frame, the bonding layer bonds the support frame and the separator together.

Second Aspect

In the fuel-cell unit cell of the first aspect, the bonding layer may be partially fused to the outer peripheral edge portion of the first gas diffusion layer at the first part.

Third Aspect

In the fuel-cell unit cell of the first or second aspect, the thickness of the bonding layer between the first separator and the outer peripheral edge portion of the membrane-electrode assembly at the first part may be not smaller than 50% of the distance between the first separator and the outer peripheral edge portion of the membrane-electrode assembly.

Fourth Aspect

In the fuel-cell unit cell of any one of the first to third aspects, between the first separator and the outer peripheral edge portion of the membrane-electrode assembly at the first part, the bonding layer may bond the first separator and the outer peripheral edge portion of the membrane-electrode assembly together.

Fifth Aspect

In the fuel-cell unit cell of any one of the first to fourth aspects, between the first separator and the support frame at the first part, the bonding layer may bond the first separator and the support frame together.

Sixth Aspect

In the fuel-cell unit cell of the fifth aspect, at a second part of the fuel-cell unit cell:

the first separator may have a reactant gas flow passage;

a cover plate may extend from between the first separator and the outer peripheral edge portion of the first gas diffusion layer to between the first separator and the support frame through between the first separator and the outer peripheral edge portion of the membrane-electrode assembly;

between the cover plate and the outer peripheral edge portion of the first gas diffusion layer, the bonding layer may bond the cover plate and the outer peripheral edge portion of the first gas diffusion layer together;

between the first separator and the outer peripheral edge portion of the membrane-electrode assembly, the bonding layer may be bonded to the outer peripheral edge portion of the membrane-electrode assembly;

between the cover plate and the support frame, the bonding layer may bond the cover plate and the support frame together; and the bonding layer may be thus separated front the reactant gas flow passage of the first separator.

Seventh Aspect

In the fuel-cell unit cell of the sixth aspect, between the first separator and the support frame at the second part, the bonding layer may bond the first separator and the support frame together.

Eighth Aspect

In the fuel-cell unit cell of the sixth or seventh aspect, at a third part of the fuel-cell unit cell:

the fuel-cell unit cell may have, between the first separator and the support frame, a communication passage that traverses the support frame so as to allow communication between the outside of the fuel-cell unit cell and the reactant gas flow passage;

the cover plate may extend from between the first separator and the outer peripheral edge portion of the first gas diffusion layer to between the first separator and the support frame through between the first separator and the outer peripheral edge portion of the membrane-electrode assembly;

between the cover plate and the outer peripheral edge portion of the first gas diffusion layer, the bonding layer may bond the cover plate and the outer peripheral edge portion of the first gas diffusion layer together;

between the first separator and the outer peripheral edge portion of the membrane-electrode assembly, the bonding layer may be bonded to the outer peripheral edge portion of the membrane-electrode assembly;

between the cover plate and the support frame, the bonding layer may bond the cover plate and the support frame together; and the bonding layer may be thus separated from the communication passage.

Ninth Aspect

In the fuel-cell unit cell of any one of the first to fourth aspects, between the second separator and the support frame at the first part, the bonding layer may bond the second separator and the support frame together.

Tenth Aspect

In the fuel-cell unit cell of the ninth aspect, at a second part of the fuel-cell unit cell:

the second separator may have a reactant gas flow passage;

a cover plate may extend from between the second separator and the second gas diffusion layer to between the second separator and the support frame;

between the first separator and the outer peripheral edge portion of the first gas diffusion layer, the bonding layer may bond the first separator and the outer peripheral edge portion of the first gas diffusion layer together;

between the first separator and the outer peripheral edge portion of the membrane-electrode assembly, the bonding layer may be bonded to the outer peripheral edge portion of the membrane-electrode assembly;

between the cover plate and the support frame, the bonding layer may bond the cover plate and the support frame together; and the bonding layer may be thus separated from the reactant gas flow passage of the second separator.

Eleventh Aspect

In the fuel-cell unit cell of the tenth aspect, between the second separator and the support frame at the second part, the bonding layer may bond the second separator and the support frame together.

Twelfth Aspect

In the fuel-cell unit cell of the tenth or eleventh aspect, at a third part of the fuel-cell unit cell:

the fuel-cell unit cell may have, between the second separator and the support frame, a communication passage that traverses the support frame so as to allow communication between the outside of the fuel-cell unit cell and the reactant gas flow passage;

the cover plate may extend from between the second separator and the second gas diffusion layer to between the second separator and the support frame;

between the first separator and the outer peripheral edge portion of the first gas diffusion layer, the bonding layer may bond the first separator and the outer peripheral edge portion of the first gas diffusion layer together;

between the first separator and the outer peripheral edge portion of the membrane-electrode assembly, the bonding layer may be bonded to the outer peripheral edge portion of the membrane-electrode assembly;

between the cover plate and the support frame, the bonding layer may bond the cover plate and the support frame together; and the bonding layer may be thus separated from the communication passage.

According to this disclosure, a fuel-cell unit cell having high mechanical durability can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic view of a fuel-cell unit cell 100 as seen from the side of a first separator 30;

FIG. 2B is a sectional view of a fuel-cell unit cell 100b according to a second embodiment of this disclosure, taken along section similar to section I-I' of FIG. 1;

FIG. 3A is a sectional view of a fuel-cell unit cell 100c according to a third embodiment of this disclosure, taken along section I-I' similar to section I-I' of FIG. 1;

FIG. 3B is a sectional view of a fuel-cell unit cell 100d according to a fourth embodiment of this disclosure, taken along section I-I' similar to section I-I' of FIG. 1;

FIG. 4 is a sectional view of a fuel-cell unit cell 100' that is not an embodiment of this disclosure, taken along a section similar to section I-I' of FIG. 1;

FIG. 5 is a schematic view of a fuel-cell unit cell 100e according to a fifth embodiment of this disclosure as seen from the side of the first separator 30;

FIG. 9 is a sectional view of the fuel-cell unit cell 100f according to the sixth embodiment of this disclosure, taken along a section similar to section III-III' of FIG. 5.

DETAILED DESCRIPTION OF EMBODIMENTS

Figure 2A:
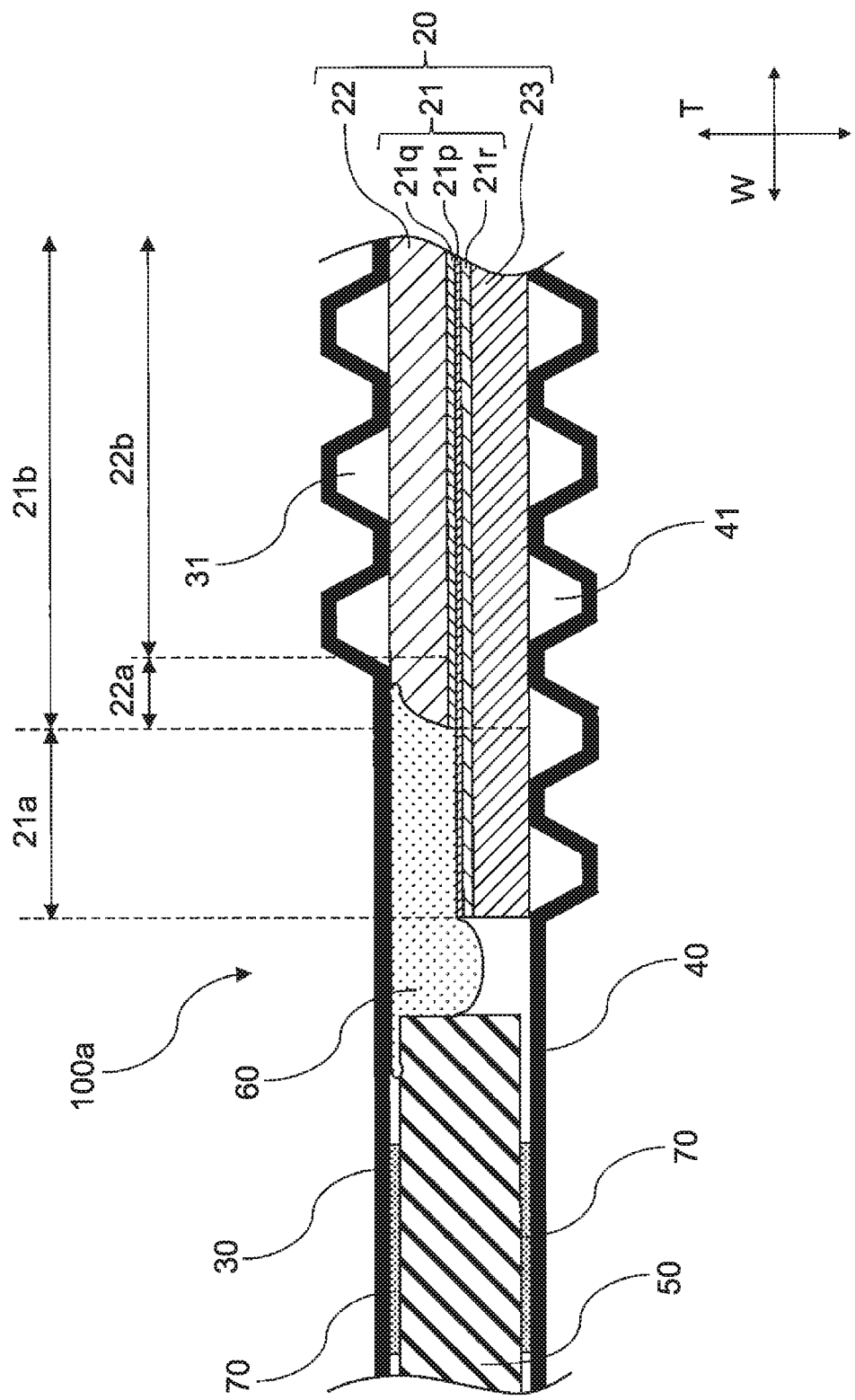
FIG. 2A is a sectional view of a fuel-cell unit cell 100a according to a first embodiment of this disclosure, taken along a section similar to section I-I' of FIG. 1.

Embodiments of this disclosure will be described in detail below. This disclosure is not limited to the following embodiments but can be implemented with various changes made thereto within the scope of the gist of the disclosure.

A fuel-cell unit cell of this disclosure includes:
(I) an electrode stack having
(a) a membrane-electrode assembly in which electrode catalyst layers are respectively laid on both surfaces of an electrolyte layer, (b) a first gas diffusion layer laid on a first surface of the membrane-electrode assembly except for an outer peripheral edge portion of the membrane-electrode assembly, and (c) a second gas diffusion layer laid on a second surface of the membrane-electrode assembly;

(II) a support frame disposed so as to surround the first gas diffusion layer;

(III) a first separator that is laid on a side of the electrode stack on which the first gas diffusion layer is located, in contact with the first gas diffusion layer, and that is fixed to the support frame; and (IV) a second separator that is laid on a side of the electrode stack on which the second gas diffusion layer is located, in contact with the second gas diffusion layer, and that is fixed to the support frame.

At a first part of the fuel-cell unit cell of this disclosure: the fuel-cell unit cell has a bonding layer; between a first separator and an outer peripheral edge portion of the first gas diffusion layer, the bonding layer bonds the first separator and the outer peripheral edge portion together; between the first separator and the outer peripheral edge portion of the membrane-electrode assembly, the bonding layer is bonded to the outer peripheral edge portion of the membrane-electrode assembly; and between the first separator and the support frame and/or between the second separator and the support frame, the bonding layer bonds these parts together.

First Part

At the first part of the fuel-cell unit cell of this disclosure: the fuel-cell unit cell has the bonding layer; between the first separator and the outer peripheral edge portion of the first gas diffusion layer, the bonding layer bonds the first separator and the outer peripheral edge portion together; between the first separator and the outer peripheral edge portion of the membrane-electrode assembly, the bonding layer is bonded to the outer peripheral edge portion of the membrane-electrode assembly; and between the first separator and the support frame and/or between the second separator and the support frame, the bonding layer bonds these parts together.

The principle underlying the high mechanical durability of the fuel-cell unit cell of this disclosure is, without it limiting the disclosure, as follows:

The first part of the fuel-cell unit cell of this disclosure has the above-described configuration in which the support frame, the membrane-electrode assembly, the first gas diffusion layer, and the first separator are fixed to one another by one bonding layer, Thus, the relationship between the relative positions of the support frame and the membrane-electrode assembly is less likely to change even when stress is applied to the support frame and the membrane-electrode assembly in an in-plane direction of the fuel-cell unit cell such that the two move away from or toward each other, during manufacturing of the fuel-cell unit cell or during manufacturing of a fuel cell stack by stacking multiple fuel-cell unit cells.

Since an end portion of the support frame facing the gas diffusion layer is fixed to the first separator by the bonding layer, the relationship between the relative positions of the support frame and the membrane-electrode assembly is less likely to change even when the support frame expands or contracts due to temperature changes during usage of the fuel cell, i.e., generation of electricity.

Between the first separator and the outer peripheral edge portion of the membrane-electrode assembly, the bonding layer is bonded to the outer peripheral edge portion of the membrane-electrode assembly, i.e., the portion of the membrane-electrode assembly that is exposed through a gap between the support frame and the first gas diffusion layer. Thus, this portion is reinforced by the bonding layer, so that the membrane-electrode assembly is less likely to deform due to a gas pressure difference between a cathode side and an anode side.

Moreover, since the first separator, the first gas diffusion layer, and the support frame are bonded to one another by the bonding layer, the relationship between the relative positions of these members is less likely to change even when, for example, stress is applied to the fuel-cell unit cell from the outside and the fuel-cell unit cell warps in an in-plane direction that is a direction toward an end portion or the center of the fuel-cell unit cell. Thus, stress applied to the membrane-electrode assembly in an in-plane direction is reduced, and the membrane-electrode assembly is less likely to fracture.

For these reasons, the fuel-cell unit cell of this disclosure has high mechanical durability.

This principle will be more specifically described using examples of fuel-cell unit cells according to embodiments of this disclosure and a fuel-cell unit cell that is not an embodiment of this disclosure.

FIG. 1 is a schematic view of a fuel-cell unit cell 100 as seen from the side of a first separator 30. In FIG. 1, L and W represent a longitudinal direction of the fuel-cell unit cell and a width direction of the fuel-cell unit cell, respectively.

As shown in FIG. 1, the fuel-cell unit cell 100 has, on the side of the first separator 30, first gas pass-through openings 10a, 10f, coolant pass-through openings 10b, 10e, and second gas pass-through openings 10c, 10d.

FIG. 2A is a sectional view of a fuel-cell unit cell 100a according to a first embodiment of this disclosure, taken along section I-I'. In FIG. 2A and FIG. 2B, L and T represent a longitudinal direction of the fuel-cell unit cell and a thickness direction, i.e., a stacking direction of the fuel-cell unit cell, respectively.

As shown in FIG. 2A, the fuel-cell unit cell 100a according to the first embodiment of this disclosure has (I) an electrode stack 20. The electrode stack 20 has: (a) a membrane-electrode assembly 21 in which electrode catalyst layers 21q, 21r are respectively laid on both surfaces of an electrolyte layer 21p; (b) a first gas diffusion layer 22 laid on a first surface of the membrane-electrode assembly 21 except for an outer peripheral edge portion 21a of the membrane-electrode assembly 21; and (c) a second gas diffusion layer 23 laid on a second surface of the membrane-electrode assembly 21.

The fuel-cell unit cell 100a according to the first embodiment of this disclosure further has: (II) a support frame 50 disposed so as to surround the first gas diffusion layer 22; (III) the first separator 30 that is laid on a side of the electrode stack 20 on which the first gas diffusion layer 22 is located, in contact with the first gas diffusion layer 22, and that is fixed to the support frame 50; and (IV) a second separator 40 that is laid on a side of the electrode stack 20 on which the second gas diffusion layer 23 is located, in contact with the second gas diffusion layer 23, and that is fixed to the support frame 50.

The first separator 30 and the second separator 40 have reactant gas flow passages 31, 41, respectively.

In FIG. 2A, the support frame 50 is disposed so as to surround the first gas diffusion layer 22 and the electrode stack 20. However, the support frame 50 should be disposed so as to surround at least the first gas diffusion layer 22. For example, as in a fuel-cell unit cell 100b according to a second embodiment of this disclosure shown in FIG. 2B, the support frame 50 may be disposed so as to overlap the membrane-electrode assembly 21 in the thickness direction T of the fuel-cell unit cell 100b.

At a first part of the fuel-cell unit cell 100a: the fuel-cell unit cell 100a has a bonding layer 60; between the first separator 30 and an outer peripheral edge portion 22a of the first gas diffusion layer 22, the bonding layer 60 bonds the first separator 30 and the outer peripheral edge portion 22a together; between the first separator 30 and the outer peripheral edge portion 21a of the membrane-electrode assembly 21, the bonding layer 60 is bonded to the outer peripheral edge portion 21a of the membrane-electrode assembly 21; and between the first separator 30 and the support frame 50, the bonding layer 60 bonds these parts together. The support frame 50 is bonded to the first separator 30 and the second separator 40 by separate bonding layers 70, although this configuration is not essential for the fuel-cell unit cell of this disclosure.

Thus, the relationship between the relative positions of the support frame 50 and the membrane-electrode assembly 21 is less likely to change even when stress is applied to the support frame 50 and the membrane-electrode assembly 21 in an in-plane direction of the fuel-cell unit cell 100a, for example, in the width direction W such that the two move away from or toward each other.

Between the first separator 30 and the outer peripheral edge portion 21a of the membrane-electrode assembly 21, the bonding layer 60 is bonded to the outer peripheral edge portion 21a of the membrane-electrode assembly 21. Thus, this portion is reinforced by the bonding layer 60, so that the membrane-electrode assembly 21 is less likely to deform due to a gas pressure difference between the cathode side and the anode side.

Moreover, since the first separator 30, the first gas diffusion layer 22, and the support frame 50 are bonded to one another by the bonding layer 60, the relationship between the relative positions of these members is less likely to change even when, for example, stress is applied to the fuel-cell unit cell 100a from the outside and the fuel-cell unit cell 100a warps in an in-plane direction, for example, in the width direction W toward an end portion or the center of the fuel-cell unit cell 100a. Thus, stress applied to the membrane-electrode assembly 21 in an in-plane direction is reduced, and the membrane-electrode assembly 21 is less likely to fracture.

Between the second separator 40 and the support frame 50, the bonding layer 60 may bond these parts together, as in a fuel-cell unit cell 100c according to a third embodiment of this disclosure shown in FIG. 3A and a fuel-cell unit cell 100d according to a fourth embodiment of this disclosure shown in FIG. 3B.

in the case of this configuration, the first separator 30, the first gas diffusion layer 22, the support frame 50, and the second separator 40 are bonded to one another by the bonding layer 60, so that the mechanical strength of the fuel-cell unit cell is further enhanced.

By contrast, for example, in a fuel-cell unit cell 100' as shown in FIG. 4 that is not an embodiment of this disclosure, the support frame 50 and the membrane-electrode assembly 21 are bonded together by the bonding layer 60 but the first separator 30 and the first gas diffusion layer 22 are not bonded to the support frame 50.

Thus, when stress is applied to the support frame 50 and the membrane-electrode assembly 21 in an in-plane direction of the fuel-cell unit cell 100', for example, in the width direction W such that the two move away from or toward each other, the relationship between the relative positions of the support frame 50 and the membrane-electrode assembly 21 is likely to change, resulting in fracture of the membrane-electrode assembly 21.

Moreover, since the end portion of the support frame 50 facing the first gas diffusion layer 22 is not bonded to the first separator, the relationship between the relative positions of the end portion of the support frame facing the gas diffusion layer and the membrane-electrode assembly fixed to the gas diffusion layer is likely to change due to heat generated during usage of the fuel-cell unit cell 100', resulting in fracture of the membrane-electrode assembly 21.

Furthermore, since there is a portion between the first separator 30 and the outer peripheral edge portion 21a of the membrane-electrode assembly 21 where the bonding layer 60 is not bonded to the outer peripheral edge portion 21a of the membrane-electrode assembly 21, the membrane-electrode assembly 21 is likely to deform due to a gas pressure difference between the cathode side and the anode side during usage of the fuel-cell unit cell.

In addition, since the first separator 30, the first gas diffusion layer 22, and the support frame 50 are not bonded to one another by the bonding layer 60, when, for example, stress is applied to the fuel-cell unit cell 100' from the outside and the fuel-cell unit cell 100' warps in an in-plane direction, for example, in the width direction W toward an end portion or the center of the fuel-cell unit cell 100', the relationship between the relative positions of these members is likely to change, resulting in fracture of especially the membrane-electrode assembly 21 that has low strength.

it is preferable that the bonding layer be partially fused to the outer peripheral edge portion of the first gas diffusion layer at the first part. Thus, the outer peripheral edge portion of the first gas diffusion layer is more firmly bonded by the bonding layer, so that the mechanical strength of the fuel-cell unit cell of this disclosure is further enhanced.

The thickness of the bonding layer between the first separator and the outer peripheral edge portion of the membrane-electrode assembly at the first part is preferably not smaller than 50% of the distance between the first separator and the outer peripheral edge portion of the membrane-electrode assembly. Thus, the outer peripheral edge portion of the membrane-electrode assembly is further reinforced, so that the membrane-electrode assembly is even less likely to deform due to a gas pressure difference between the cathode side and the anode side during usage of the fuel-cell unit cell.

The thickness of the bonding layer between the first separator and the outer peripheral edge portion of the membrane-electrode assembly may be not smaller than 50%, 60%, 70%, or 80% of the distance between the first separator and the outer peripheral edge portion of the membrane-electrode assembly. The thickness of the bonding layer is more preferably 100% of the distance, which means that the bonding layer between the first separator and the outer peripheral edge portion of the membrane-electrode assembly bonds the first separator and the outer peripheral edge portion together.

Second Part

When the bonding layer between the first separator and the support frame bonds these parts together at the first part of the fuel-cell unit cell of this disclosure, at a second part of the fuel-cell unit cell: the first separator may have a reactant gas flow passage; a cover plate may extend from between the first separator and the outer peripheral edge portion of the first gas diffusion layer to between the first separator and the support frame through between the first separator and the outer peripheral edge portion of the membrane-electrode assembly; between the cover plate and the outer peripheral edge portion of the first gas diffusion layer, the bonding layer may bond the cover plate and the outer peripheral edge portion together; between the first separator and the outer peripheral edge portion of the membrane-electrode assembly, the bonding layer may be bonded to the outer peripheral edge portion of the membrane-electrode assembly; between the cover plate and the support frame, the bonding layer may bond these parts together; and the bonding layer may be thus separated from the reactant gas flow passage of the first separator.

Here, the reactant gas flow passage is a flow passage that is used to supply a reactant gas, supplied from the outside of the fuel-cell unit cell, to the gas diffusion layer of the fuel-cell unit cell, or to discharge a reactant gas that has not been consumed in cell reactions to the outside of the fuel-cell unit cell. Examples of the reactant gas include an anode gas, such as a hydrogen gas, and a cathode gas, such as an oxygen gas.

When the second part of the fuel-cell unit cell of this disclosure has the above-described configuration in which the cover plate extends from between the first separator and the outer peripheral edge portion of the first gas diffusion layer to between the first separator and the support frame through between the first separator and the outer peripheral edge portion of the membrane-electrode assembly, the bonding layer is separated from the reactant gas flow passage of the first separator, so that the bonding layer while being formed is less likely to penetrate into and close the reactant gas flow passage. Moreover, as high mechanical strength as at the first part can be achieved at the second part.

The position of the second part in the fuel-cell unit cell of this disclosure is not particularly limited. For example, the second part can be disposed in an area adjacent to the first gas pass-through openings 10a, 10f, the coolant pass-through openings 10b, 10e, or the second gas pass-through openings 10c, 10d, like the area where section II-II' of FIG. 5 is located.

Figure 6:
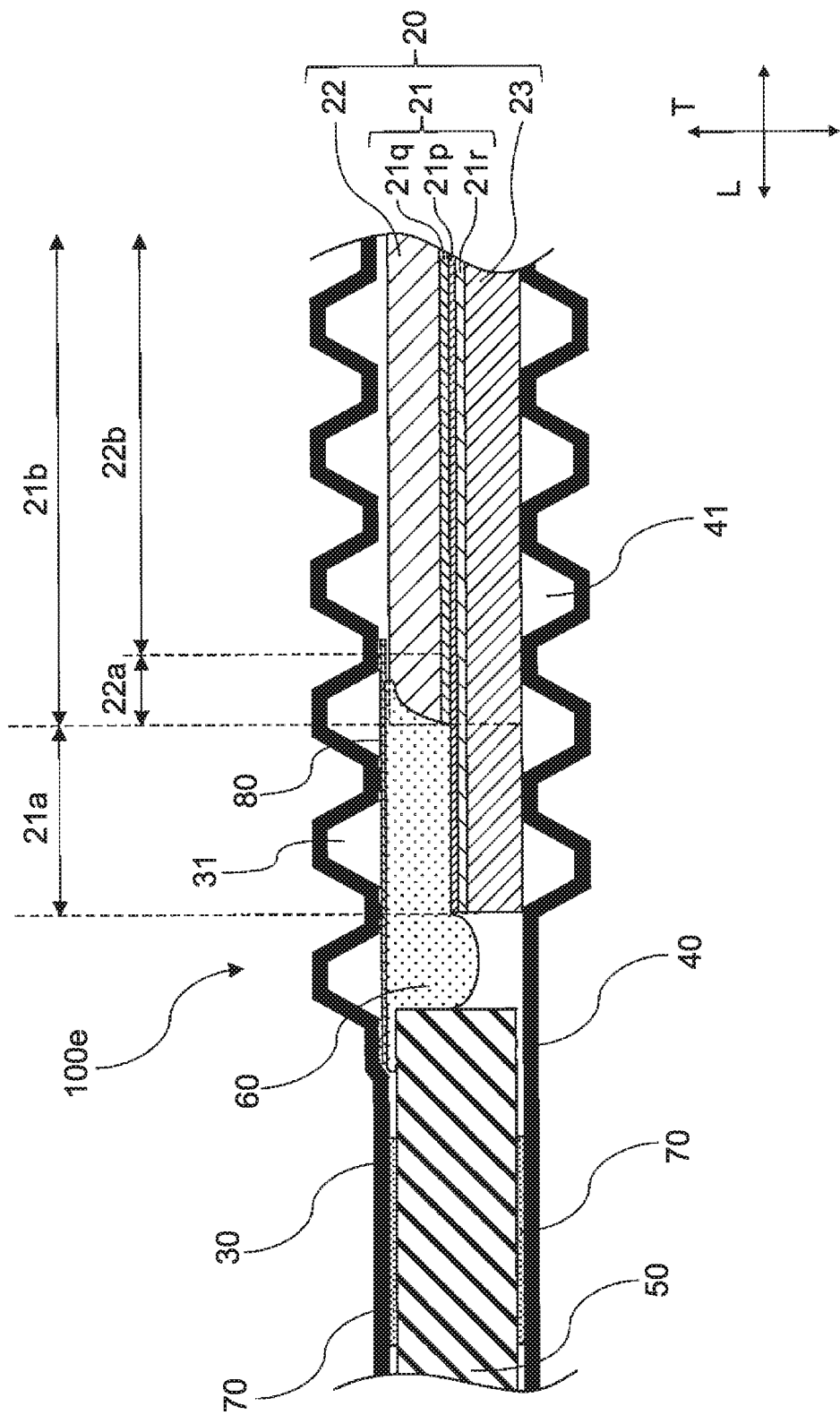
FIG. 6 is a sectional view of the fuel-cell unit cell 100e according to the fifth embodiment of this disclosure, taken along section II-II'.

Specifically, the second part may have the configuration as shown in FIG. 6.

FIG. 6 is a sectional view of a fuel-cell unit cell 100e according to a fifth embodiment of this disclosure, taken along section II-II'.

As shown in FIG. 6, at the second part of the fuel-cell unit cell 100e according to the fifth embodiment of this disclosure: the first separator 30 has the reactant gas flow passages 31; a cover plate 80 extends from between the first separator 30 and the outer peripheral edge portion 22a of the first gas diffusion layer 22 to between the first separator 30 and the support frame 50 through between the first separator 30 and the outer peripheral edge portion 21a of the membrane-electrode assembly 21; between the cover plate 80 and the outer peripheral edge portion 22a of the first gas diffusion layer 22, the bonding layer 60 bonds the cover plate 80 and the outer peripheral edge portion 22a together; between the first separator 30 and the outer peripheral edge portion 21a of the membrane-electrode assembly 21, the bonding layer 60 is bonded to the outer peripheral edge portion 21a of the membrane-electrode assembly 21; between the cover plate 80 and the support frame 50, the bonding layer 60 bonds these parts together; and the bonding layer 60 is thus separated from the reactant gas flow passages 31 of the first separator 30.

The reactant gas flows through the reactant gas flow passages 31 in the longitudinal direction L in FIG. 5, i.e., a direction perpendicular to the sheet of the drawing in FIG. 6.

It is preferable that the bonding layer between the first separator and the support frame bond also these parts together at the second part of the fuel-cell unit cell of this disclosure.

Since the cover plate and the first separator are thus bonded together through the bonding layer, the positional relationship between the cover plate and the first separator is less likely to change even when, for example, stress is applied to the fuel-cell unit cell from the outside and the fuel-cell unit cell warps in an in-plane direction that is a direction toward an end portion or the center of the fuel-cell unit cell. Therefore, the strength of the second part of the fuel-cell unit cell can be further enhanced.

When the bonding layer between the second separator and the support frame bonds these parts together at the first part of the fuel-cell unit cell of this disclosure, at a second part of the fuel-cell unit cell: the second separator may have a reactant gas flow passage; a cover plate may extend from between the second separator and the second gas diffusion layer to between the second separator and the support frame; between the first separator and the outer peripheral edge portion of the first gas diffusion layer, the bonding layer may bond the first separator and the outer peripheral edge portion together; between the first separator and the outer peripheral edge portion of the membrane-electrode assembly, the bonding layer may be bonded to the outer peripheral edge portion of the membrane-electrode assembly; between the cover plate and the support frame, the bonding layer may bond these parts together; and the bonding layer may be thus separated from the reactant gas flow passage of the second separator.

When the second part of the fuel-cell unit cell of this disclosure has the above-described configuration in which the cover plate extends from between the second separator and the second gas diffusion layer to between the second separator and the support frame, the bonding layer is separated from the reactant gas flow passage of the second separator, so that the bonding layer while being formed is less likely to penetrate into and close the reactant gas flow passage. Moreover, as high mechanical strength as at the first part can be achieved at the second part.

The position of the second part in the fuel-cell unit cell of this disclosure is not particularly limited. For example, the second part can be disposed in an area adjacent to the first gas pass-through openings 10a, 10f, the coolant pass-through openings 10b, 10e, or the second gas pass-through openings 10c, 10d, like the area where section II-II' of FIG. 5 is located.

Figure 7:
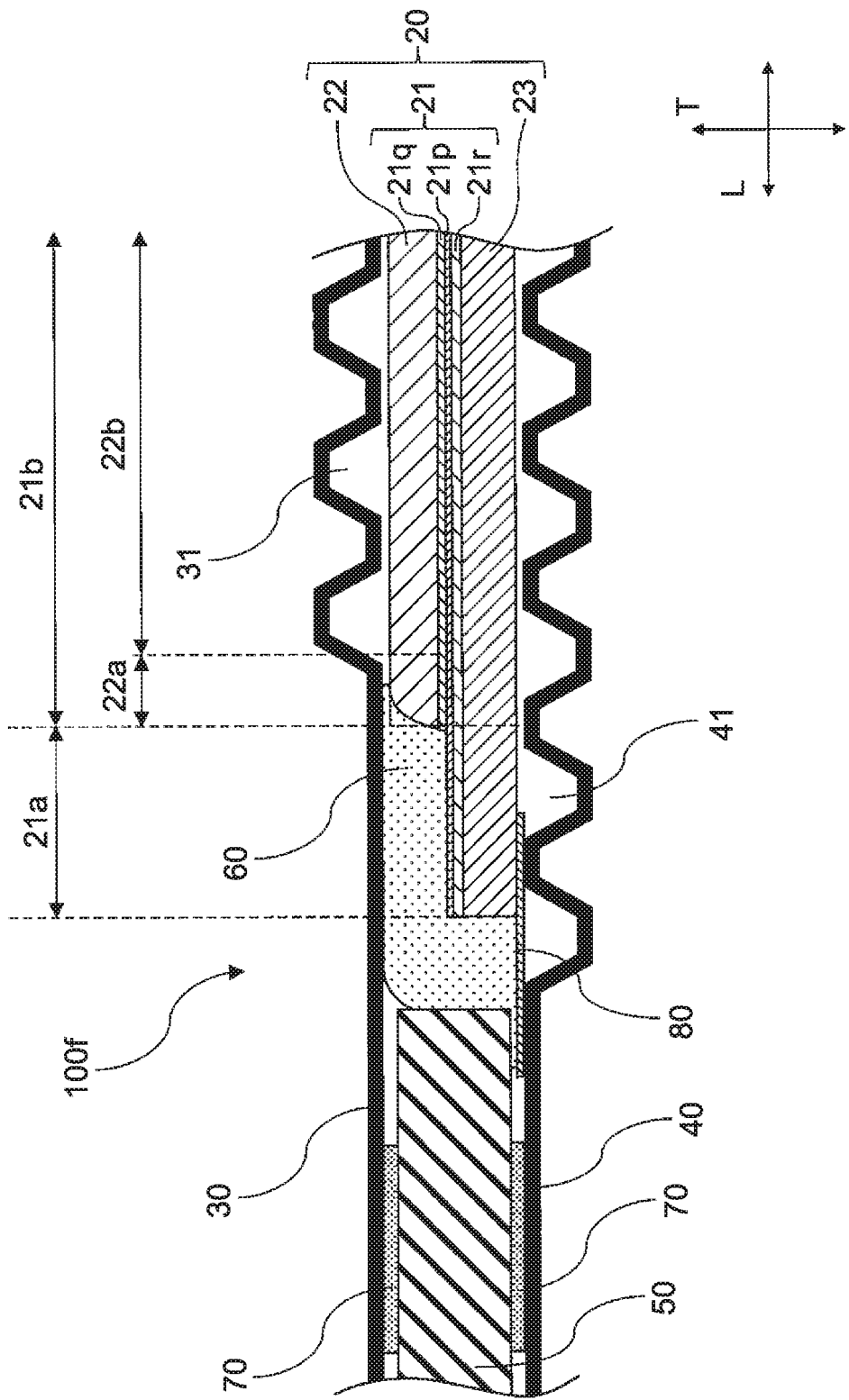
FIG. 7 is a sectional view of a fuel-cell unit cell 100f according to a sixth embodiment of this disclosure, taken along a section similar to section II-II' of FIG. 5.

Specifically, the second part may have the configuration as shown in FIG. 7.

FIG. 7 is a sectional view of a fuel-cell unit cell 100f according to a sixth embodiment of this disclosure, taken along section II-II'.

As shown in FIG. 7, at the second part of the fuel-cell unit cell 100f according to the sixth embodiment of this disclosure: the second separator 40 has the reactant gas flow passages 41; a cover plate 80 extends from between the second separator 40 and the second gas diffusion layer 23 to between the second separator 40 and the support frame 50; between the first separator 30 and the outer peripheral edge portion 22a of the first gas diffusion layer 22, the bonding layer 60 bonds the first separator 30 and the outer peripheral edge portion 22a together; between the first separator 30 and the outer peripheral edge portion 21a of the membrane-electrode assembly 21, the bonding layer 60 is bonded to the outer peripheral edge portion 21a of the membrane-electrode assembly 21; between the cover plate 80 and the support frame 50, the bonding layer 60 bonds these parts together; and the bonding layer 60 is thus separated from the reactant gas flow passages 41 of the second separator 40.

The reactant gas flows through the reactant gas flow passages 41 in the longitudinal direction L in FIG. 5, i.e., a direction perpendicular to the sheet of the drawing in FIG. 7.

It is preferable that the bonding layer between the second separator and the support frame bond also these parts together at the second part.

Since the cover plate and the second separator are thus bonded together through the bonding layer, the positional relationship between the cover plate and the second separator is less likely to change even when, for example, stress is applied to the fuel-cell unit cell from the outside and the fuel-cell unit cell warps in an in-plane direction that is a direction toward an end portion or the center of the fuel-cell unit cell. Therefore, the strength of the second part of the fuel-cell unit cell can be further enhanced.

Moreover, since the first separator, the first gas diffusion layer, the support frame, and the second separator are bonded to one another by the bonding layer, the mechanical strength of the fuel-cell unit cell is further enhanced.

It is preferable that the bonding layer be partially fused to the outer peripheral edge portion of the first gas diffusion layer at the second part. Thus, the outer peripheral edge portion of the first gas diffusion layer is more firmly bonded by the bonding layer, so that the mechanical strength of the fuel-cell unit cell of this disclosure is further enhanced.

The thickness of the bonding layer between the first separator and the outer peripheral edge portion of the membrane-electrode assembly at the second part is preferably not smaller than 50% of the distance between the first separator and the outer peripheral edge portion of the membrane-electrode assembly. Thus, the outer peripheral edge portion of the membrane-electrode assembly is further reinforced, so that the membrane-electrode assembly is even less likely to deform due to a gas pressure difference between the cathode side and the anode side during usage of the fuel-cell unit cell.

The thickness of the bonding layer between the first separator and the outer peripheral edge portion of the membrane-electrode assembly may be not smaller than 50%, 60%, 70%, or 80% of the distance between the first separator and the outer peripheral edge portion of the membrane-electrode assembly. The thickness of the bonding layer is more preferably 100% of the distance, which means that the bonding layer between the first separator and the outer peripheral edge portion of the membrane-electrode assembly bonds the first separator and the outer peripheral edge portion together.

Third Part

When the second part of the fuel-cell unit cell of this disclosure has the above-described configuration, a third part of the fuel-cell unit cell may have the following configuration.

When the cover plate extends from between the first separator and the outer peripheral edge portion of the first gas diffusion layer to between the first separator and the support frame through between the first separator and the outer peripheral edge portion of the membrane-electrode assembly at the second part of the fuel-cell unit cell of this disclosure, i.e., when the second part thereof has the configuration, for example, as shown in FIG. 6, at the third part of the fuel-cell unit cell of this disclosure: the fuel-cell unit cell may have, between the first separator and the support frame, a communication passage that traverses the support frame so as to allow communication between the outside of the fuel-cell unit cell and the reactant gas flow passage; a cover plate may extend from between the first separator and the outer peripheral edge portion of the first gas diffusion layer to between the first separator and the support frame through between the first separator and the outer peripheral edge portion of the membrane-electrode assembly; between the cover plate and the outer peripheral edge portion of the first gas diffusion layer, the bonding layer may bond the cover plate and the outer peripheral edge portion together; between the first separator and the outer peripheral edge portion of the membrane-electrode assembly, the bonding layer may be bonded to the outer peripheral edge portion of the membrane-electrode assembly; between the cover plate and the support frame, the bonding layer may bond these parts together; and the bonding layer may be thus separated from the communication passage.

When the cover plate extends from between the second separator and the outer peripheral edge portion of the membrane-electrode assembly to between the second separator and the support frame at the second part of the fuel-cell unit cell of this disclosure, i.e., when the second part thereof has the configuration, for example, as shown in FIG. 7, at the third part of the fuel-cell unit cell of this disclosure: the fuel-cell unit cell may have, between the second separator and the support frame, a communication passage that traverses the support frame so as to allow communication between the outside of the fuel-cell unit cell and the reactant gas flow passage; a cover plate may extend from between the second separator and the second gas diffusion layer to between the second separator and the support frame; between the first separator and the outer peripheral edge portion of the first gas diffusion layer, the bonding layer may bond the first separator and the outer peripheral edge portion together; between the first separator and the outer peripheral edge portion of the membrane-electrode assembly, the bonding layer may be bonded to the outer peripheral edge portion of the membrane-electrode assembly; between the cover plate and the support frame, the bonding layer may bond these parts together; and the bonding layer may be thus separated from the communication passage.

Here, the communication passage is a passage that traverses the support frame so as to allow communication between the outside of the fuel-cell unit cell and the reactant gas flow passage. The communication passage is a passage through which the reactant gas flows in and out between the outside and inside of the fuel-cell unit cell. Examples of the reactant gas include an anode gas, such as a hydrogen gas, and a cathode gas, such as an oxygen gas.

When the second part and the third part of the fuel-cell unit cell of this disclosure have the above-described structures in which the communication passage is formed between the first separator or the second separator and the support frame and the bonding layer is separated from the communication passage at the third part, the bonding layer is less likely to close the communication passage. Moreover, as high mechanical strength as at the first part can be achieved at the third part.

The position of the third part in the fuel-cell unit cell of this disclosure is not particularly limited. For example, the third part can be disposed in an area where the first gas pass-through openings 10a, 10f, the coolant pass-through openings 10b, 10e, or the second gas pass-through openings 10c, 10d are disposed, like the area where sectional III-III' of FIG. 5 is located.

Figure 8:
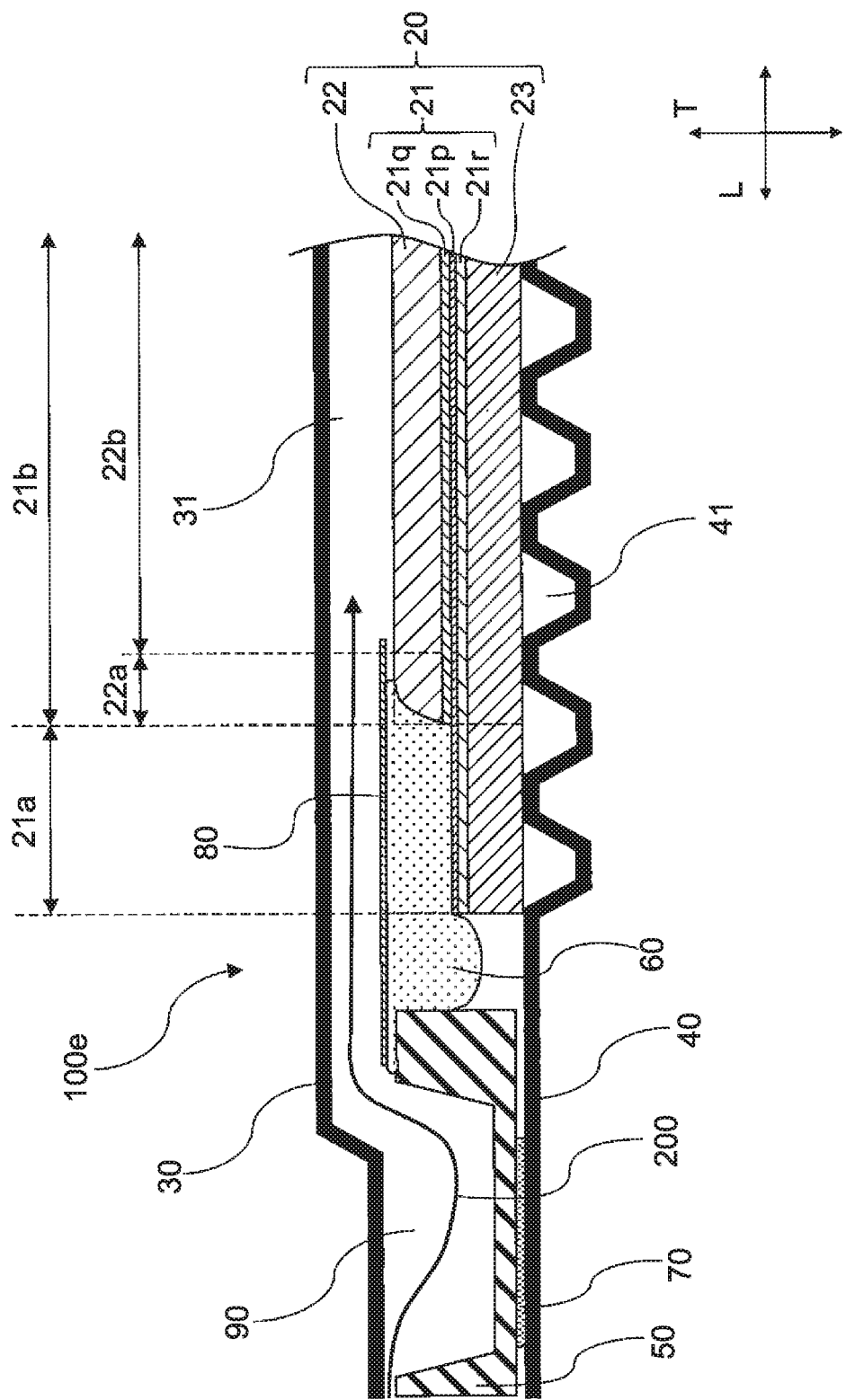
FIG. 8 is a sectional view of the fuel-cell unit cell 100e according to the fifth embodiment of this disclosure, taken along a section similar to section III-III' of FIG. 5.

When the second part of the fuel-cell unit cell of this disclosure has, for example, the structure as shown in FIG. 6, the third part thereof may have, for example, the structure as shown in FIG. 8.

FIG. 8 is a sectional view of the fuel-cell unit cell 100e according to the fifth embodiment of this disclosure, taken along section III-III'.

As shown in FIG. 8, the fuel-cell unit cell 100e of this disclosure has, between the first separator 30 and the support frame 50 at the third part, a communication passage 90 that traverses the support frame 50 so as to allow communication between the outside of the fuel-cell unit cell 100e and the reactant gas flow passage 31. The cover plate 80 extends from between the first separator 30 and the outer peripheral edge portion 22a of the first gas diffusion layer 22 to between the first separator 30 and the support frame 50 through between the first separator 30 and the outer peripheral edge portion 21a of the membrane-electrode assembly 21. Between the cover plate 80 and the outer peripheral edge portion 22a of the first gas diffusion layer 22, the bonding layer 60 bonds the cover plate 80 and the outer peripheral edge portion 22a together. Between the first separator 30 and the outer peripheral edge portion 21a of the membrane-electrode assembly 21, the bonding layer 60 is bonded to the outer peripheral edge portion 21a of the membrane-electrode assembly 21. Between the cover plate 80 and the support frame 50, the bonding layer 60 bonds these parts together. The bonding layer 60 is thus separated from the communication passage 90. The reactant gas may flow from the outside of the fuel-cell unit cell 100e into the reactant gas flow passage 31 by flowing in the direction of an arrow 200.

When the second part of the fuel-cell unit cell of this disclosure has, for example, the structure as shown in FIG. 7, the third part thereof may have, for example, the structure as shown in FIG. 9.

FIG. 9 is a sectional view of the fuel-cell unit cell 100f according to the sixth embodiment of this disclosure, taken along section III-III'.

As shown in FIG. 9, the fuel-cell unit cell 100f of this disclosure has, between the second separator 40 and the support frame 50 at the third part, a communication passage 90 that traverses the support frame 50 so as to allow communication between the outside of the fuel-cell unit cell 100f and the reactant gas flow passage 41. The cover plate 80 extends from between the second separator 40 and the second gas diffusion layer 23 to between the second separator 40 and the support frame 50. Between the first separator 30 and the outer peripheral edge portion 22a of the first gas diffusion layer 22, the bonding layer 60 bonds the first separator 30 and the outer peripheral edge portion 22a together. Between the first separator 30 and the outer peripheral edge portion 21a of the membrane-electrode assembly 21, the bonding layer 60 is bonded to the outer peripheral edge portion 21a of the membrane-electrode assembly 21. Between the cover plate 80 and the support frame 50, the bonding layer 60 bonds these parts together. The bonding layer 60 is thus separated from the communication passage 90. The reactant gas may flow from the outside of the fuel-cell unit cell 100f into the reactant gas flow passage 41 by flowing in the direction of the arrow 200.

It is preferable that the bonding layer be partially fused to the outer peripheral edge portion of the first gas diffusion layer at the third part. Thus, the outer peripheral edge portion of the first gas diffusion layer is more firmly bonded by the bonding layer, so that the mechanical strength of the fuel-cell unit cell of this disclosure is further enhanced.

The thickness of the bonding layer between the first separator and the outer peripheral edge portion of the membrane-electrode assembly at the third part is preferably not smaller than 50% of the distance between the first separator and the outer peripheral edge portion of the membrane-electrode assembly. Thus, the outer peripheral edge portion of the membrane-electrode assembly is further reinforced, so that the membrane-electrode assembly is even less likely to deform due to a gas pressure difference between the cathode side and the anode side during usage of the fuel-cell unit cell.

The thickness of the bonding layer between the first separator and the outer peripheral edge portion of the membrane-electrode assembly may be not smaller than 50%, 60%, 70%, or 80% of the distance between the first separator and the outer peripheral edge portion of the membrane-electrode assembly. The thickness of the bonding layer is more preferably 100% of the distance, which means that the bonding layer between the first separator and the outer peripheral edge portion of the membrane-electrode assembly bonds the first separator and the outer peripheral edge portion together.

Electrode Stack

In this disclosure, the electrode stack has the following (a) to (c):

(a) a membrane-electrode assembly in which electrode catalyst layers are respectively laid on both surfaces of an electrolyte layer;

(b) a first gas diffusion layer laid on a first surface of the membrane-electrode assembly except for an outer peripheral edge portion of the membrane-electrode assembly; and (c) a second gas diffusion layer laid on a second surface of the membrane-electrode assembly.

Membrane-Electrode Assembly

The membrane-electrode assembly has the electrolyte layer and the electrode catalyst layers respectively laid on both surfaces of the electrolyte layer.

Electrolyte Layer

An arbitrary material that can be used for an electrolyte layer of a fuel-cell unit cell can be used as the material of the electrolyte layer. Examples of such a material include fluorine polymer membranes having ion conductivity, more specifically, ion-exchange membranes having proton conductivity and containing perfluorosulfonic acid.

Electrode Catalyst Layer

Examples of the electrode catalyst layer include an anode catalyst layer and a cathode catalyst layer. The anode catalyst layer and the cathode catalyst layer may be catalyst layers in which a catalytic metal is supported by a carrier.

The catalytic metal may be an arbitrary catalytic metal that is used for a fuel cell catalyst. Examples of such a catalytic metal include Pt, Pd, Rh, and alloys containing these metals.

The carrier may be an arbitrary carrier that is used for a fuel cell catalyst. Examples of such a carrier include carbon carriers, more specifically, carbon particles of glassy carbon, carbon black, active carbon, coke, natural graphite, artificial graphite, or the like.

Gas Diffusion Layer

In this disclosure, the first gas diffusion layer is laid on the first surface of the membrane-electrode assembly except for the outer peripheral edge portion thereof, and the second gas diffusion layer is laid on the second surface of the membrane-electrode assembly.

Of the first gas diffusion layer and the second gas diffusion layer, one is an anode gas diffusion layer and the other is a cathode gas diffusion layer.

The material of the first gas diffusion layer and the second gas diffusion layer may be an arbitrary material that can be used for an anode gas diffusion layer and a cathode gas diffusion layer of a fuel cell catalyst. Examples of such a material include electrically conductive porous materials. More specifically, examples of such porous materials include porous carbon materials, such as carbon paper, carbon cloth, and glasslike carbon, and porous metal materials, such as metal mesh and foam metal.

Support Frame

The support frame is disposed so as to surround the first gas diffusion layer.

When the fuel-cell unit cell of this disclosure has the third part, the support frame may have, at the third part, a groove that allows communication between the inside and outside of the fuel-cell unit cell, and the communication passage may be formed by this groove.

The support frame is made of an arbitrary material that can provide electrical insulation and airtightness. Examples of such a material include crystalline polymers, more specifically, engineering plastics. Examples of engineering plastics include polyethylene naphthalate (PEN) resins and polyethylene terephthalate (PET) resins.

First Separator

The first separator is laid on a side of the electrode stack on which the first gas diffusion layer is located, in contact with the first gas diffusion layer, and is fixed to the support frame.

The first separator may have a plurality of grooves in a surface facing the first gas diffusion layer, and the reactant gas flow passages may be formed by these grooves. The grooves may have an arbitrary shape, for example, a serpentine shape, as long as the grooves can supply the reactant gas to the first gas diffusion layer.

The first separator may have a first gas pass-through opening, a coolant pass-through opening, and a second gas pass-through opening.

The material of the first separator may be an arbitrary material that can be used for a separator of a fuel-cell unit cell, and may be a material having gas impermeability and electrical conductivity. Examples of such a material include dense carbon formed by compressing carbon so as to have gas impermeability, and metal plates formed by pressing.

Second Separator

The second separator is laid on a side of the electrode stack on which the second gas diffusion layer is located, in contact with the second gas diffusion layer, and is fixed to the support frame.

The material and structure of the second separator may be the same as those of the first separator.

Bonding Layer

As the bonding layer, a layer of an arbitrary adhesive can be used that can bond together the first separator, the first gas diffusion layer, the membrane-electrode assembly, the support frame, and the second separator, and that can keep these members bonded together under the service conditions of the fuel-cell unit cell.

Examples of such an adhesive include, but are not limited to, adhesive resins such as thermoplastic resins, thermosetting resins, and UV-curing resins. When a thermoplastic resin is used as the adhesive, that resin preferably has a softening point higher than the temperature of heat generated during usage of the fuel-cell unit cell.

Cover Plate

The material of the cover plate is not particularly limited as long as it is a sheet-shaped material that can be bonded to the first gas diffusion layer, the membrane-electrode assembly, and the support frame by the bonding layer. Examples of such a material include titanium, stainless steel, polyphenylene sulfide (PPS), and polypropylene (PP).

None of the drawings used to describe this disclosure is intended to limit the configuration, structure, and other features of the fuel-cell unit cell of this disclosure.

What is claimed is:

1. A fuel-cell unit cell comprising:
(I) an electrode stack having
   (a) a membrane-electrode assembly in which electrode catalyst layers are respectively laid on both surfaces of an electrolyte layer,
   (b) a first gas diffusion layer laid oil a first surface of the membrane-electrode assembly except for an outer peripheral edge portion of the membrane-electrode assembly, and
   (c) a second gas diffusion layer laid on a second surface of the membrane-electrode assembly;
(II) a support frame disposed so as to surround the first gas diffusion layer;
(III) a first separator that is laid on a side of the electrode stack on which the first gas diffusion layer is located, in contact with the first gas diffusion layer, and that is fixed to the support frame; and
(IV) a second separator that is laid on a side of the electrode stack on which the second gas diffusion layer is located, in contact with the second gas diffusion layer, and that is fixed to the support frame,
wherein, at a first part of the fuel-cell unit cell:
the fuel-cell unit cell has a bonding layer;
between the first separator and an outer peripheral edge portion of the first gas diffusion layer, the bonding layer bonds the first separator and the outer peripheral edge portion of the first gas diffusion layer;
between the first separator and the outer peripheral edge portion of the membrane-electrode assembly, the bonding layer is bonded to the outer peripheral edge portion of the membrane-electrode assembly; and
between the first separator and the support frame and/or between the second separator and the support frame, the bonding layer bonds the support frame and the first separator and/or the second separator between which the bonding layer is disposed.

2. The fuel-cell unit cell according to claim 1, wherein the bonding layer is partially fused to the outer peripheral edge portion of the first gas diffusion layer at the first part.

3. The fuel-cell unit cell according to claim 1, wherein a thickness of the bonding layer between the first separator and the outer peripheral edge portion of the membrane-electrode assembly at the first part is not smaller than 50% of a distance between the first separator and the outer peripheral edge portion of the membrane-electrode assembly.

4. The fuel-cell unit cell according to claim 1, wherein, between the first separator and the outer peripheral edge portion of the membrane-electrode assembly at the first part, the bonding layer bonds the first separator and the outer peripheral edge portion of the membrane-electrode assembly together.

5. The fuel-cell unit cell according to claim 1, wherein, between the first separator and the support frame at the first part, the bonding layer bonds the first separator and the support frame together.

6. The fuel-cell unit cell according to claim 5, wherein, at a second part of the fuel-cell unit cell:
the first separator has a reactant gas flow passage;
a cover plate extends from between the first separator and the outer peripheral edge portion of the first gas diffusion layer to between the first separator and the support frame through between the first separator and the outer peripheral edge portion of the membrane-electrode assembly;
between the cover plate and the outer peripheral edge portion of the first gas diffusion layer, the bonding layer bonds the cover plate and the outer peripheral edge portion of the first gas diffusion layer together;
between the first separator and the outer peripheral edge portion of the membrane-electrode assembly, the bonding layer is bonded to the outer peripheral edge portion of the membrane-electrode assembly;
between the cover plate and the support frame, the bonding layer bonds the cover plate and the support frame together; and
the bonding layer is thus separated from the reactant gas flow passage of the first separator.

7. The fuel-cell unit cell according to claim 6, wherein, between the first separator and the support frame at the second part, the bonding layer bonds the first separator and the support frame together.

8. The fuel-cell unit cell according to claim 6, wherein, at a third part of the fuel-cell unit cell:
the fuel-cell unit cell has, between the first separator and the support frame, a communication passage that traverses the support frame so as to allow communication between an outside of the fuel-cell unit cell and the reactant gas flow passage;
the cover plate extends from between the first separator and the outer peripheral edge portion of the first gas diffusion layer to between the first separator and the support frame through between the first separator and the outer peripheral edge portion of the membrane-electrode assembly;
between the cover plate and the outer peripheral edge portion of the first gas diffusion layer, the bonding layer bonds the cover plate and the outer peripheral edge portion of the first gas diffusion layer together;
between the first separator and the outer peripheral edge portion of the membrane-electrode assembly, the bonding layer is bonded to the outer peripheral edge portion of the membrane-electrode assembly;
between the cover plate and the support frame, the bonding layer bonds the cover plate and the support frame together; and
the bonding layer is thus separated from the communication passage.

9. The fuel-cell unit cell according to claim 1, wherein, between the second separator and the support frame at the first part, the bonding layer bonds the second separator and the support frame together.

10. The fuel-cell unit cell according to claim 9, wherein, at a second part of the fuel-cell unit cell:
the second separator has a reactant gas flow passage;
a cover plate extends from between the second separator and the second gas diffusion layer to between the second separator and the support frame;
between the first separator and the outer peripheral edge portion of the first gas diffusion layer, the bonding layer bonds the first separator and the outer peripheral edge portion of the first gas diffusion layer together;
between the first separator and the outer peripheral edge portion of the membrane-electrode assembly, the bonding layer is bonded to the outer peripheral edge portion of the membrane-electrode assembly;

between the cover plate and the support frame, the bonding layer bonds the cover plate and the support frame together; and the bonding layer is thus separated from the reactant gas flow passage of the second separator.

11. The fuel-cell unit cell according to claim 10, wherein, between the second separator and the support frame at the second part, the bonding layer bonds the second separator and the support frame together.

12. The fuel-cell unit cell according to claim 10, wherein, at a third part of the fuel-cell unit cell:
the fuel-cell unit cell has, between the second separator and the support frame, a communication passage that traverses the support frame so as to allow communication between an outside of the fuel-cell unit cell and the reactant gas flow passage;
the cover plate extends from between the second separator and the second gas diffusion layer to between the second separator and the support frame;
between the first separator and the outer peripheral edge portion of the first gas diffusion layer, the bonding layer bonds the first separator and the outer peripheral edge portion of the first gas diffusion layer together;
between the first separator and the outer peripheral edge portion of the membrane-electrode assembly, the bonding layer is bonded to the outer peripheral edge portion of the membrane-electrode assembly;
between the cover plate and the support frame, bonding layer bonds the cover plate and the support frame together; and
the bonding layer is thus separated from the communication passage.

* * * * *